(12) United States Patent
Aulich et al.

(10) Patent No.: US 8,304,591 B2
(45) Date of Patent: *Nov. 6, 2012

(54) OPTIMAL ENERGY PATHWAY TO RENEWABLE DOMESTIC AND OTHER FUELS

(75) Inventors: Ted R. Aulich, Grand Forks, ND (US); Chad A. Wocken, Grand Forks, ND (US); Ronald C. Timpe, Grand Forks, ND (US); Paul Pansegrau, Grand Forks, ND (US)

(73) Assignee: Energy & Environmental Research Center Foundation, Grand Forks, ND (US)

( * ) Notice: Subject to any disclaimer, the term of this patent is extended or adjusted under 35 U.S.C. 154(b) by 108 days.

This patent is subject to a terminal disclaimer.

(21) Appl. No.: 13/014,126

(22) Filed: Jan. 26, 2011

(65) Prior Publication Data

US 2012/0083633 A1      Apr. 5, 2012

Related U.S. Application Data

(63) Continuation of application No. 11/840,191, filed on Aug. 16, 2007, now Pat. No. 7,897,824.

(60) Provisional application No. 60/822,637, filed on Aug. 16, 2006.

(51) Int. Cl.
*C07C 1/00* (2006.01)
(52) U.S. Cl. .................................................. 585/240
(58) Field of Classification Search .................. 585/240
See application file for complete search history.

(56) References Cited

U.S. PATENT DOCUMENTS

| 4,102,938 | A | * | 7/1978 | Rao ............................... 585/640 |
| 5,705,722 | A | | 1/1998 | Monnier et al. |
| 5,713,965 | A | | 2/1998 | Foglia et al. |
| 6,712,867 | B1 | | 3/2004 | Boocock |
| 7,491,858 | B2 | * | 2/2009 | Murzin et al. ............... 585/240 |

(Continued)

FOREIGN PATENT DOCUMENTS

CA    2149685 A1    12/1995
(Continued)

OTHER PUBLICATIONS

Mathias Snare et al; "Continuous Deoxygenation of Ethyl Stearate—A Model Reaction for Production of Diesel Fuel Hydrocarbons"; Organic Reactions Catalysis Society, 2006; pp. 1-13.

(Continued)

*Primary Examiner* — Cephia D Toomer
(74) *Attorney, Agent, or Firm* — Gifford, Krass, Sprinkle, Anderson & Citkowski, P.C.

(57) ABSTRACT

A novel, energy efficient process of producing jet fuel is disclosed herein. The process is based on utilizing a medium chain fatty acid source such as cuphea oil, which precludes the need for high-energy fatty acid chain cracking to achieve the shorter molecules needed for jet fuels and other fuels with low-temperature flow requirements. In an embodiment, a process for producing a jet fuel comprises providing a medium chain fatty acid source. The method also comprises cleaving the one or more medium chain fatty acid groups from the glycerides to form glycerol and one or more free fatty acids. The method further comprises decarboxylating the one or more medium chain fatty acids to form one or more hydrocarbons for the production of the jet fuel.

18 Claims, 3 Drawing Sheets

U.S. PATENT DOCUMENTS

| | | | |
|---|---|---|---|
| 7,897,824 B2* | 3/2011 | Aulich et al. | 585/240 |
| 2004/0074760 A1* | 4/2004 | Portnoff et al. | 204/157.15 |
| 2005/0188606 A1 | 9/2005 | Caprotti et al. | |
| 2005/0262760 A1 | 12/2005 | Lawson et al. | |
| 2006/0161032 A1 | 7/2006 | Murzin et al. | |
| 2007/0010682 A1 | 1/2007 | Myllyoja et al. | |

FOREIGN PATENT DOCUMENTS

| | | |
|---|---|---|
| WO | WO-2004022674 A1 | 3/2004 |
| WO | WO-2007003709 A1 | 1/2007 |

OTHER PUBLICATIONS

International Search Report for PCT/US2007/076233, Dated Mar. 3, 2008.

Butnark; Thermally Stable Coal-Based Jet Fuel Chemical Composition, Thermal Stability Physical Properties and their Relationships; The Pennsylvania State University Library [online]; Dec. 2003; [retrieved on Dec. 20, 2007]; Retrieved from the internet: URL:http://etda.libraries.psu.edu/theses/approved/WorldWideFiles/ETD-411/sbutnark.pdf>, especially p. 3, para 2, p. 14, para 2.

* cited by examiner

US 8,304,591 B2

OPTIMAL ENERGY PATHWAY TO RENEWABLE DOMESTIC AND OTHER FUELS

RELATED APPLICATIONS

The present application is a continuation of, and claims priority to, U.S. patent application Ser. No. 11/840,191 filed Aug. 16, 2007, which claims priority of U.S. Provisional Patent Application Ser. No. 60/822,637 filed Aug. 16, 2006, the entirety of which is incorporated herein by reference.

FIELD OF THE INVENTION

The present invention relates to a process for producing jet fuel, and in particular, to a process for producing jet fuel using a medium chain fatty acid source.

BACKGROUND

This invention relates to a process for producing fuels. More specifically, the invention relates to an energy efficient process of producing jet fuels utilizing biological fatty acid sources.

Alkyl esters, including methyl ester or ethyl ester, also known as "biodiesel", are a renewable and clean burning alternative to conventional petroleum-derived diesel fuel. Biodiesel is made from a raw or used vegetable oil or animal fat, typically soybean oil or rapeseed oil (which are composed of triglycerides, diglycerides, monoglycerides, fatty acids (FA), or combinations thereof). Because biodiesel is made from natural oil or fat sources, the alkyl esters typically comprise $C_{14}$ to $C_{18}$ fatty chains if derived from vegetable oil, and $C_{16}$ to $C_{22}$ fatty chains if derived from animal fat. Biodiesel can be combusted in diesel (combustion-ignition) engines either in pure form or as blended with petroleum-derived diesel fuel. Biodiesel provides the benefits of a renewable resource as well as providing lower sulfur emissions than petroleum diesel.

A common route to produce bio diesel from biologically derived oils is through a process called transesterification. A common transesterification process is illustrated below.

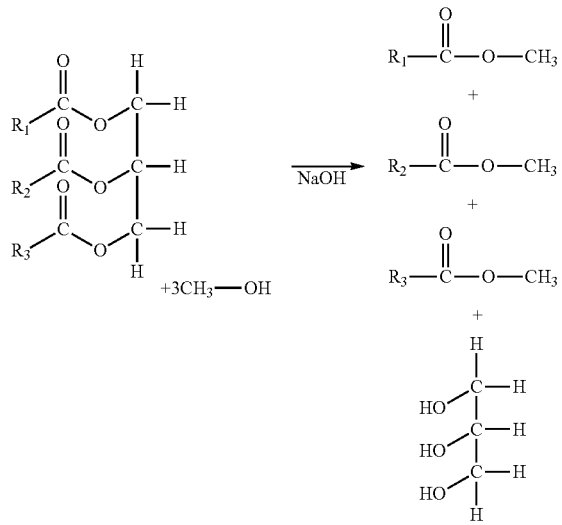

However, biodiesel produced by this process typically does not meet transportation diesel requirements, e.g., these esters typically gel below $-10°$ C. For improved performance, thermal and catalytic chemical bond-breaking (cracking) technologies have been developed that enable converting bio-oils into bio-based alternatives to petroleum-derived diesel fuel and other fuels, such as jet fuel.

Cleaving FA chains from glycerol and cracking longer FA chains into shorter (lower-carbon-number) molecules are used to ensure adequate fuel flow performance at low (down to $-50°$ C.) temperatures, oxygen removal is required to ensure adequate fuel energy density, and replacement of oxygen with hydrogen is required to ensure fuel chemical stability (resistance to polymerization). Because additional energy input is required to crack C16 and C18 FA chains (which comprise the primary FA constituents of soybean, sunflower, corn, rapeseed, canola, cottonseed, and other common vegetable oils) into shorter molecules, the overall energy efficiency of such a process is diminished.

Consequently, there is a need for a more energy efficient method of producing fuels from biological sources such as natural oils and fats.

SUMMARY OF THE INVENTION

A novel, energy efficient process of producing jet fuel is disclosed herein. The process is based on utilizing a medium chain fatty acid source such as cuphea oil, which precludes the need for high-energy fatty acid chain cracking to achieve the shorter molecules needed for jet fuels and other fuels with low-temperature flow requirements. Other aspect and advantages of the process will be described in more detail below.

In an embodiment, a process for producing a jet fuel comprises providing a medium chain fatty acid source comprising glycerides having one or more medium chain fatty acid groups with no more than 16 carbon atoms. The method also comprises cleaving the one or more medium chain fatty acid groups from the glycerides to form glycerol and one or more free fatty acids. In addition the method comprises separating the one or more medium chain fatty acids from the glycerol. The method further comprises decarboxylating the one or more medium chain fatty acids to form one or more hydrocarbons for the production of the jet fuel.

In another embodiment, a process for producing a jet fuel comprises providing a medium chain fatty acid source comprising glycerides having one or more medium chain fatty acid groups with no more than 16 carbon atoms. The method also comprises directly decarboxylating the glycerides to simultaneously cleave the one or more medium chain fatty acid groups and form one or more hydrocarbons for the production of jet fuel.

In yet another embodiment, a process for producing a jet fuel comprise providing a medium chain fatty acid source comprising glycerides having one or more medium chain fatty acid groups with no more than 16 carbon atoms. In addition, the method comprises reducing the glycerides to form one or more hydrocarbons for the production of jet fuel.

The foregoing has outlined rather broadly the features and technical advantages of embodiments of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ".

As used herein, "jet fuel" may refer to any composition used as fuel in jet-engined aircraft.

DETAILED DESCRIPTION OF THE PREFERRED EMBODIMENTS

Figure 1:
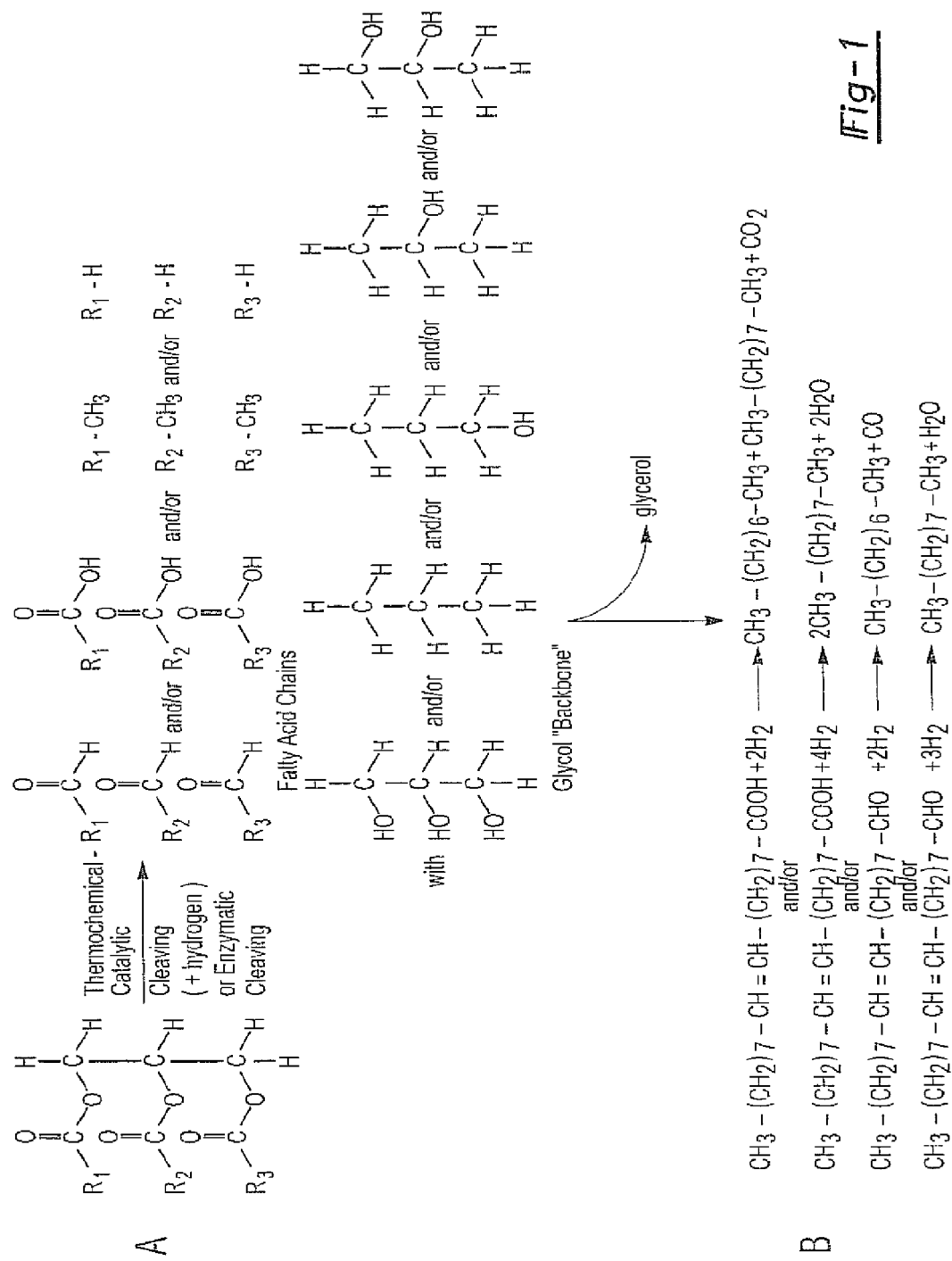
FIGS. 1A-B illustrating an embodiment of the disclosed process.

FIGS. 1A-B illustrate an embodiment of a method of producing a liquid fuel such as jet fuel. Generally, the feedstock mixture (e.g. a natural fatty acid source such as natural plant or vegetable oils and/or fats) may be subjected to the following processing steps either sequentially, or in tandem, or simultaneously, such that the operations are achieved in no particular order. In embodiments, a fatty acid (FA) source may initially be provided. The fatty acid source is then disassembled or cleaved into FA chains and glycerol as shown in FIG. 1A. The FA chains may then be separated from the glycerol. Ultimately, the FA chains may be decarboxylated to form one or more hydrocarbons and, potentially if required, any unsaturated hydrocarbon chains may be hydrogenated to produce one or more alkanes for the desired jet fuel as shown in FIG. 1B.

An innovative aspect of the disclosed methods is the production of bio-based jet fuel by first selecting natural oils comprised of FA chains of lengths corresponding to the desired fuel product. That is, a mixture of normal and isomerized alkanes may be produced that matches the carbon chain mixture of existing jet fuel types. Typically, jet fuel comprises a mixture of hydrocarbons having from 8 to 16 carbon atoms with traces of C6-C8 as well as traces of C17 and higher. Preferably these traces are less than 10%, even more preferably less than 5%. Thus, it is desirable to select fatty acid sources having fatty acid composition with the same or substantially similar numbers of carbon atoms, or the same or substantially similar molecular weight distribution as the ultimate jet fuel product (e.g. JP-4, JP-5, JP-6, JP-7, JP-8, Jet A1, Jet A, Jet B, kerosene, Diesel 1, Diesel 2, Fuel Oil 1, Fuel Oil 2, etc.).

Preferably, a medium chain fatty acid source is provided as feedstock for the method. As used here, "medium chain fatty acids" refer to saturated or unsaturated fatty acid groups having no more than 16 carbon atoms in the primary fatty acid chain. Examples of medium chain fatty acids include without limitation, caproic acid (C6), caprylic acid (C8), capric acid (C10) and lauric acid (C12). A medium chain fatty acid source refers to biologically derived or natural oils or a blend of oils comprising glycerides having medium chain fatty acid groups. The glycerides may be monoglycerides, diglycerides, triglycerides, or combinations thereof. Accordingly, embodiments of the method eliminate the need for the high-energy input requirements cracking of C16, C18, and longer FA chains into shorter hydrocarbons.

In an embodiment, medium chain fatty acid source may comprise a glyceride with the following formula:

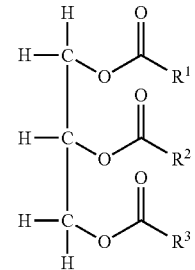

where $R^1$-$R^3$ may each independently comprise an alkyl group, alkenyl group or hydrogen. $R^1$—$R^3$ may be the same or different from one another. The alkyl group or alkenyl group may have from 1 to 16 carbon atoms. Furthermore, the alkyl or alkenyl group may be branched or unbranched.

In an embodiment, the medium chain fatty acid source may be cuphea oil. The cuphea oil may be a blend of oils obtained from the four *Cuphea* flowering plant species: *Cuphea lanceolata, Cuphea carthagenensis, Cuphea epilobiifolia*, and *Cuphea strigulosa*. Additionally, the medium chain fatty acid source may include without limitation, coconut oil, palm oil, almond oil, canola oil, cocoa butter oil, corn oil, cotton seed oil, flaxseed oil, grape seed oil, olive oil, palm kernel, peanut oil, safflower oil, sesame oil, soybean oil, sunflower oil, walnut oil, or combinations thereof. The FA composition of each of these oils is listed in Tables 1 and 2. The medium chain fatty acid source may also, in some embodiments, be derived from genetically modified plant sources. In a further embodiment, the medium fatty acid source may be algae oil. The algae oil may be derived from any species of algae. Alternatively, the algae oil may be derived from a genetically modified species of algae.

The oil blend, after undergoing the aforementioned processing steps, may provide a product mixture of normal paraffins corresponding to the hydrocarbon composition of typical jet fuels such as JP-8 and/or molecular weight distribution representative. Alternatively, fatty acid sources from animal or fish sources may be blended with cuphea-derived oil. The FA composition of selected fatty acid sources from this group is listed in Table 3.

TABLE 1

Fatty Acid Composition (as % of total fatty acids) of Selected *Cuphea* Species

| Species | C8 | C10 | C12 | C14 | C16 and Others |
|---|---|---|---|---|---|
| Cuphea lanceolata | 88 | 2 | 1 | 9 | 0 |
| Cuphea carthagenensis | 5 | 81 | 5 | 9 | 0 |
| Cuphea epilobiifolia | <1 | 20 | 68 | 12 | 0 |
| Cuphea strigulosa | 1 | 18 | 14 | 45 | 22 |

TABLE 2

Fatty Acid Composition of Selected Oil Producing Plants

| SOURCE | C8 | C10 | C12 | C14 | C16 | C18 | C18:1 | C18:2 | C18:3 |
|---|---|---|---|---|---|---|---|---|---|
| ALMOND | 0 | 0 | 0 | 0 | 7 | 2 | 69.0 | 17 | 0 |
| CANOLA OIL | 0 | 0 | 0 | 0 | 4 | 2 | 62.0 | 22 | 10 |
| COCOA BUTTER | 0 | 0 | 0 | 0 | 25 | 38 | 32.0 | 3 | 0 |
| COCONUT OIL | 0 | 6 | 47 | 18 | 9 | 3 | 6.0 | 2 | 0 |
| CORN OIL | 0 | 0 | 0 | 0 | 11 | 2 | 28.0 | 58 | 1 |
| COTTONSEED OIL | 0 | 0 | 0 | 1 | 22 | 3 | 19.0 | 54 | 1 |
| FLAXSEED OIL | 0 | 0 | 0 | 0 | 3 | 7 | 21.0 | 16 | 53 |
| GRAPE SEED OIL | 0 | 0 | 0 | 0 | 8 | 4 | 15.0 | 73 | 0 |
| OLIVE OIL | 0 | 0 | 0 | 0 | 13 | 3 | 71.0 | 10 | 0 |
| PALM OIL | 0 | 0 | 0 | 1 | 45 | 4 | 40.0 | 10 | 0 |
| PALM OLEIN | 0 | 0 | 0 | 1 | 37 | 4 | 46.0 | 11 | 0 |
| PALM KERNAL OIL | 0 | 4 | 48 | 16 | 8 | 3 | 15.0 | 2 | 0 |
| PEANUT OIL | 0 | 0 | 0 | 0 | 11 | 2 | 48.0 | 32 | 0 |
| SAFFLOWER OIL | 0 | 0 | 0 | 0 | 7 | 2 | 13.0 | 78 | 0 |
| SESAME OIL | 0 | 0 | 0 | 0 | 9 | 4 | 41.0 | 45 | 0 |
| SOYBEAN OIL | 0 | 0 | 0 | 0 | 11 | 4 | 24.0 | 54 | 7 |
| SUNFLOWER OIL | 0 | 0 | 0 | 0 | 7 | 5 | 19.0 | 68 | 1 |

TABLE 3

Fatty Acid Composition of Selected Animal Oils.

| SOURCE | C8 | C10 | C12 | C14 | C16 | C18 | C18:1 | C18:2 | C18:3 |
|---|---|---|---|---|---|---|---|---|---|
| BEEF TALLOW | 0 | 0 | 0 | 3 | 24 | 19 | 43.0 | 3 | 1 |
| BEEF TALLOW | 0 | 0 | 0 | 3 | 24 | 19 | 43.0 | 3 | 1 |
| BUTTERFAT (COW) | 0 | 3 | 3 | 11 | 27 | 12 | 29.0 | 2 | 1 |

Blends of *Cuphea*-derived, vegetable-derived, animal, and also single-cell-derived oils may be utilized for the conversion of these blends to jet fuel. Additionally, oil from genetically modified sources may be used in blending suitable feedstocks. The oils listed in Tables 1, 2, and 3 are not to be considered inclusive, as oils both currently known and currently unknown may serve equally well as feedstocks for the spirit of this invention.

Once the appropriate medium chain fatty acid source has been selected, in the form of oils and blends, the fatty acid source may be processed to cleave the fatty acids from the glycerol backbone. The fatty acids may be cleaved from the glycerol using any methods and techniques known to one of skill in the art. Furthermore, the fatty acid group may be cleaved without a chemical change to the glycerol backbone. However, the fatty acids are preferably cleaved using a process such as for example, a thermochemical-catalytic process. As used herein, "thermochemical-catalytic process" is any process where the reactants are heated to initiate the reaction and additionally involves the use of one or more catalysts. One such thermochemical-catalytic process for cleaving fatty acids from a glycerol backbone is described in Myllyoja et al., U.S. patent application Ser. No. 11/477,922 ("Myllyoja"), herein incorporated by reference in its entirety. In one embodiment, the cleavage process involves a decarboxylation reaction as described in Myllyoja.

Alternatively, the process may comprise the disassembly of a medium chain fatty acid source from glycerol by decarboxylation of the FA chains while still attached to the glycerol backbone, thus simultaneously cleaving the fatty acid group and producing glycerol and one or more hydrocarbon products. The hydrocarbon product may therefore be one carbon shorter in chain length than the original FA.

In another embodiment, the FA chains may be reduced while still attached to the glycerol backbone, also producing glycerol and one or more hydrocarbon products. The hydrocarbon product may therefore comprise the same carbon length as the original FA coupled to the glyceride. The reduction is preferably performed in the presence of hydrogen and any suitable catalyst. In an additional embodiment, the fatty acid source may be disassembled by chemical reduction of the glycerol backbone, thereby producing propane, propanol, propanediol, other glycerol-derived products, or combinations thereof.

Catalysts which would be suitable for the conversion of natural fatty acid sources to normal hydrocarbons would be individual metals such as palladium, platinum, nickel, silver, gold, copper, or mixed or promoted metals, such as cobalt-molybdenum, nickel-molybdenum. The catalyst metal or mixed metals may be supported by carbon, silica, alumina, or other materials known to the art. In addition, the catalyst may be porous. The metal-support combination may be in the form or a powder or a formed extrudate. The extrudate may be shaped into any 3-dimensional shape. This list is not included to be inclusive, and other metals many function equally well as those listed here.

The conversion of the medium chain fatty acid source may be performed in the presence of the catalyst at temperatures from about 250° C. to about 350° C., preferably about 280° C. to about 320° C., but more preferably about 300° C. The conversion of the fatty acid source may be performed in the presence of hydrogen, preferably at a gauge pressure ranging from about 50 psig to about 200 psig, preferably ranging from about 75 psig to about 150 psig, more preferably from about 90 psig to about 125 psig. The catalyst is most preferably prepared for usage by pretreatment with hydrogen, resulting in reduction of the active metal. The reduction of catalyst is performed at an elevated temperature resulting in removal of water during the reduction step.

Alternatively, fatty acids may be cleaved by an enzymatic process such as the process described in U.S. Pat. No. 4,394,445, herein incorporated by reference in its entirety for all purposes, or other biological processes known in the art. Examples of enzymes that may be used include without limitation, esterases, lipases, proteases, or combinations thereof. As used herein, "biological process" is any process utilizing biological organisms (e.g. bacteria, algae, etc.) to accomplish the desired reaction. In another embodiment, the fatty acids may be cleaved from the glycerol backbone by acid-catalyzed hydrolysis of the glycerides in the fatty acid source.

After cleavage of the fatty acids from the glycerol, the glycerol may be separated from the fatty acids. The separation may be accomplished by any suitable methods including without limitation, liquid-liquid extraction, supercritical solvent extraction, distillation, membrane filtration, acidulation, centrifugation, by gravity separation, or combinations thereof. Once separated from the fatty acids, the separated glycerol may be used for further reforming or other purposes.

Upon separation from glycerol, the fatty acids may then be processed to form the C8-C16 alkanes needed for jet fuel. In embodiments, the fatty acids may be deoxygenated or decarboxylated to form the desired alkanes. As with cleavage of the fatty acids from glycerol, the fatty acid deoxygenation may be accomplished using thermochemical-catalytic processes or biological processes. An example of a suitable thermochemical catalytic deoxygenation process is described in detail in Snåre, M., Kubickova, I., Mäki-Arvela, P., Eränen, K., Murzin, D. Yu., *Continuous deoxygenation of ethyl stearate—a model reaction for production of diesel fuel hydrocarbons*, Catalysis of Organic Reactions 115, (2006), 415-425, herein incorporated by reference in its entirety for all purposes. The deoxygenation reaction may be carried out in a fixed bed tubular reactor over a heterogeneous catalyst under elevated temperatures and pressures.

Figure 2:
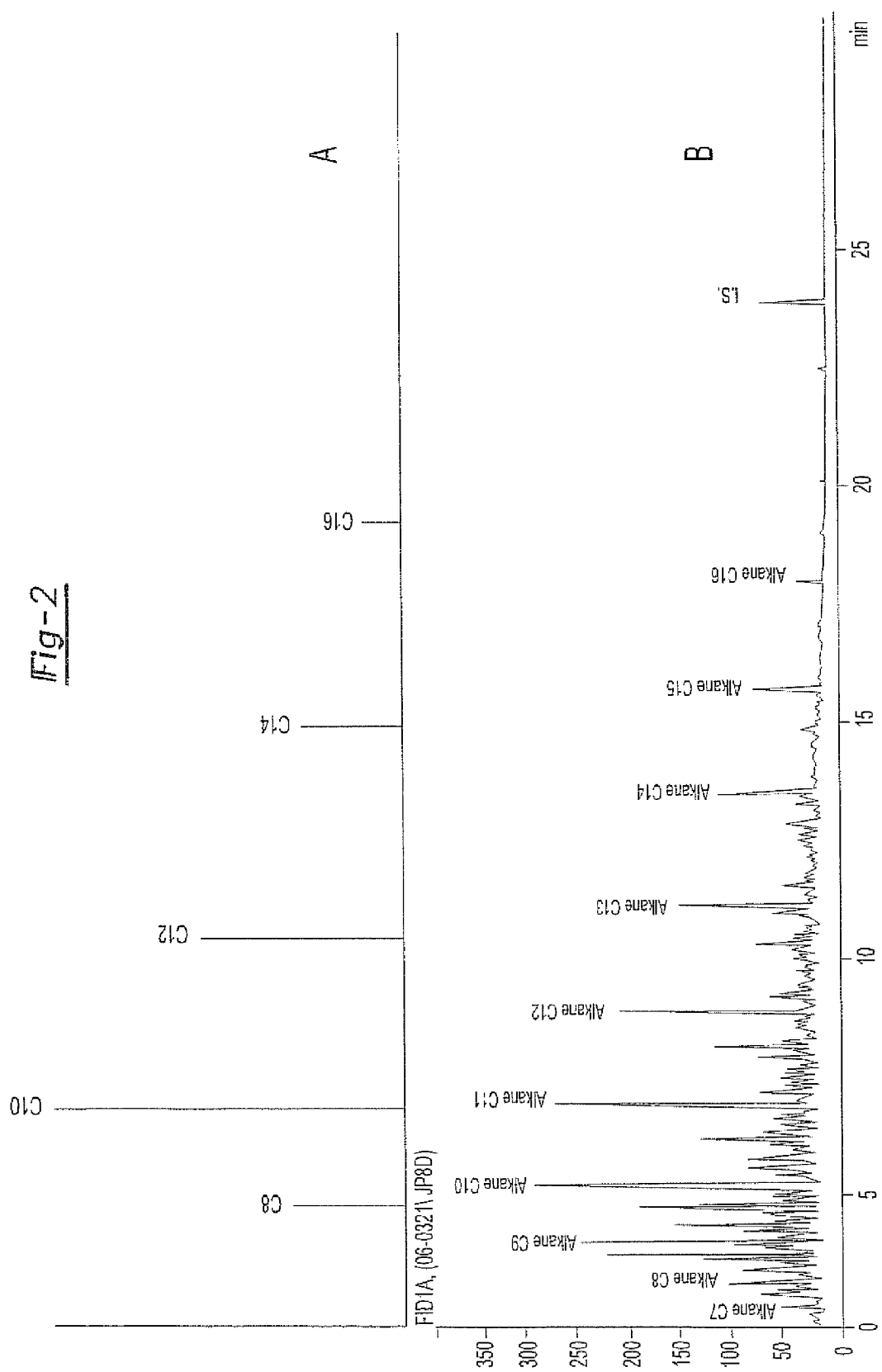
FIG. 2A is an idealized chromatogram of showing a mixture of normal alkanes in a jet fuel such as JP-8 jet fuel.
FIG. 2B is a chromatogram of JP-8 jet fuel showing that it primarily comprises C6 through C16 hydrocarbons.

As shown in FIG. 2, a specific type of jet fuel that may be produced by embodiments of the method is JP-8 jet fuel. This jet fuel comprises a mixture of primarily C8-C16 normal alkanes, with lesser amounts of other hydrocarbon compounds. The resulting product may comprise a mixture of primarily normal alkanes within the C8-C16 carbon number range and in appropriate proportion to be able to meet the MIL-DTL-83133E specification for JP-8, as shown in FIG. 2 for example. In embodiments, the one or more hydrocarbons formed from the disclosed processes may be distilled to remove longer or shorter FA chains or hydrocarbon products thereof to meet specific fuel requirements. Any known distillation columns and techniques may be used in conjunction with the disclosed processes.

In addition to C8-C16 normal alkanes, the resulting jet fuel may comprise iso-alkanes, cyclo-alkanes, and alkyl-aromatic hydrocarbons. In a specific embodiment, the jet fuel may comprise the following composition: approximately 20% normal alkanes, about 40% iso-alkanes, about 20% cycloalkanes, and about 20% alkyl-aromatic hydrocarbons. Thus, in an embodiment, at least a portion of the one or more hydrocarbons produced from the fatty acids may be isomerized. The iso-alkanes required for jet fuel production may be prepared by isomerization of the normal alkanes via standard oil refining technologies employing commercially utilized catalyst. The isomerization may be achieved, for example, by use of platinum, palladium, silver, gold, copper, nickel, other transition metals, or other known catalysts on a suitable support. Heteropolyacids may also be employed as catalyst. The support may by mordenite, ferrierite, alumina silicate, or other support known in the art. The isomerization temperature may be in the range of 200° C. to 300° C., with 240° C. to 275° C. being preferred, and 240° C. being most preferred. The initial hydrogen pressure may be in the range of atmospheric to 10,000 psig, with 200 to 2000 psig being preferred, and 500-1200 psig being most preferred. The reactor may be of any type suitable for the intended purpose, including, but not limited to autoclave-type, and continuous tubular-type. The catalyst may be in the form of powder or shaped pellets.

Jet fuel alkyl-aromatics typically comprise alkylbenzene compounds ranging in carbon number from C8 to C16 which may be prepared techniques known in the art such as described in U.S. Pat. No. 4,229,602, incorporated herein by reference in its entirety for all purposes. Alternatively, aromatics can be provided by a variety of scenarios, one of which could involve the use of technologies for converting lignin (recoverable from cuphea and other biooil-containing seeds or husks or from other sources such as algaes) into jet fuel-quality alkylbenzene compounds. The cyclo-alkanes could be prepared from the alkyl-aromatics by art such as described in U.S. Pat. No. 5,000,839, incorporated herein by reference in its entirety for all purposes. In addition, other sources of natural alkanes such as conventional fossil-based fuels could be blended to make up a bio-fossil fuel blend. A full integrated scheme of an embodiment of the disclosed process for producing fuel-grade products is outlined in FIG. 3.

Figure 3:
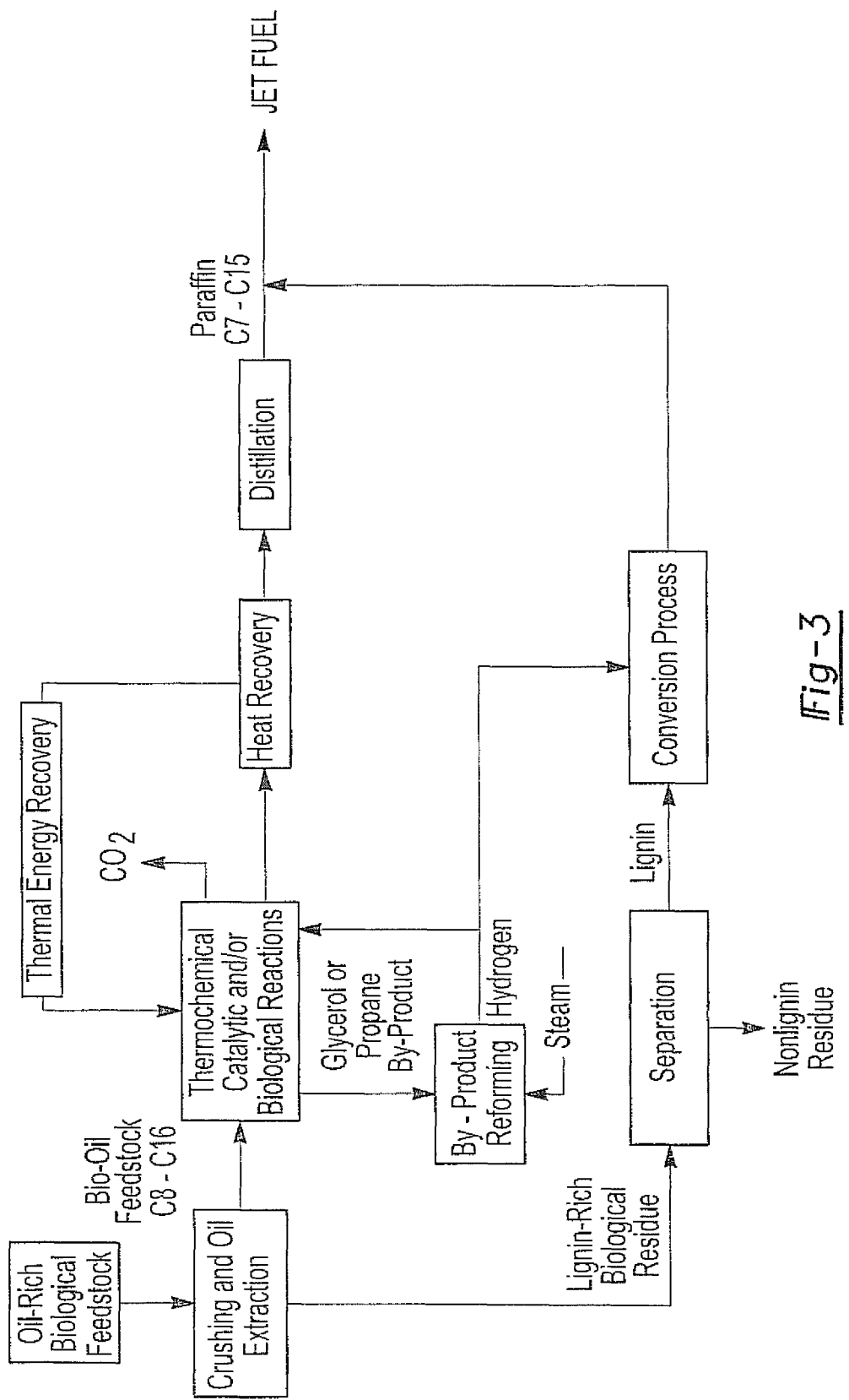
FIG. 3 is a block diagram illustrating an embodiment of a process for the production of a fuel such as JP-8 jet fuel.

FIG. 3 illustrates a set of general process steps, some of which could be conducted via thermochemical-catalytic methods, biological (including enzyme-based, organism-based, or other biological) methods, or a combination of thermochemical catalytic and biological methods, which, when applied to a specific mixture of feedstock triglycerides, yields a fuel-grade product. As an example, in the method described above, the fatty acid source; thermochemical-catalytic, biological, and/or combination of thermochemical-catalytic and biological technologies; and reaction conditions utilized are appropriate for production of a fuel, such as a fuel that is able to meet the U.S. military MIL DTL-83133E specification for JP-8 jet fuel. Some examples of other jet fuels which may be produced by embodiments of the disclosed process include without limitation, JP-4, JP-5, JP-6, JP-7, JP-8, Jet A1, Jet A, Jet B, kerosene, Diesel 1, Diesel 2, Fuel Oil 1, Fuel Oil 2 or combinations thereof. Preferably, the jet fuel produced comprises at least about 10% hydrocarbons produced from the natural medium chain fatty acid source, preferably at least about 25%, more preferably at least about 50%. Of course, embodiments of the method may be applied to other types of fuels besides jet fuels.

To further illustrate various illustrative embodiments of the invention, the following example is provided.

EXAMPLE

A suitable reactor containing reduced catalyst is heated to 300° C. A flow of hydrogen gas is initiated to the heated reactor at a pressure of 100 psig. The hydrogen flow is adjusted to be in excess of that required based upon biooil feed rate and minimum stoichiometric requirements. A natural fatty acid source such as a biological oil is pumped into the reactor while both temperature and hydrogen flow are maintained. The fatty acid source is contacted with the catalyst in the presence of hydrogen. The result is conversion of the fatty acid source to predominantly a normal hydrocarbon product. Some isomerization of the normal hydrocarbon may or may not occur, based upon both the catalyst and support employed. The product mixture is condensed by chilling the outlet line from the reactor and the product is collected in a receiver vessel. The crude product may be subjected to distillation, and the paraffinic product of appropriate boiling point range for jet fuel is recovered from the distillation process. The paraffinic product is subjected to isomerization catalyst and conditions in a suitable reactor. The resulting product is a crude product which may be subjected to a second distillation. The resulting product contains a mixture of normal and isomerized hydrocarbons useful as a jet fuel blend stock. Further processing, either by subjecting either the normal paraffin product or the isomerized product to aromatization and reduction conditions may provide aromatic and cycloparaffinic products useful as additional blendstocks for jet fuel. Appropriate combination of these blend stocks will provide a mixture useful as jet fuel. Alternatively, appropriate alkyl-aromatic components may be purchased and blended with the isomerized product. Alternatively, appropriate cycloparaffinic products may be blend with the isomerized and alkyl aromatic mixture, thus providing a mixture useful as jet fuel.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference in the Description of the Related Art is not an admission that it is prior art to the invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

The invention claimed is:

1. A process for producing a jet fuel comprising:
   a) providing a medium chain fatty acid source comprising glycerides having one or more medium chain fatty acid groups with no more than 16 carbon atoms;
   b) cleaving the one or more medium chain fatty acid groups from the glycerides to form glycerol and one or more free fatty acids;
   c) separating the one or more medium chain fatty acids from the glycerol and reducing the glycerol to form propane, propanol, propanediol, or combinations thereof; and
   d) decarboxylating the one or more medium chain fatty acids to form one or more hydrocarbons for the production of the jet fuel.

2. The process of claim 1 wherein the one or more medium chain fatty acid groups are C6 to C16 fatty acid groups.

3. The process of claim 1 wherein the one or more medium chain fatty acid groups have a molecular weight distribution substantially similar to a jet fuel selected from the group consisting of JP-4, JP-5, JP-6, JP-7, JP-8, Jet A1, Jet A, Jet B, kerosene, Diesel 1, Diesel 2, Fuel Oil 1, and Fuel Oil 2.

4. The process of claim 1 wherein the fatty acid source comprises cuphea oil, coconut oil, palm oil, algae oil, or combinations thereof.

5. The process of claim 1 wherein the *cuphea* oil is derived from a *Cuphea* plant species selected from the group consisting of *Cuphea lanceolata, Cuphea carthagenensis, Cuphea epilobiifolia, Cuphea strigulosa*, and combinations thereof.

6. The process of claim 1 wherein the one or more medium chain fatty acid groups are unsaturated or saturated.

7. The process of claim 1 further comprising hydrogenating the one or more hydrocarbons to form one or more alkanes.

8. The process of claim 1 wherein (b) comprises cleaving the one or more medium chain fatty acid groups from the glycerides by using a thermochemical-catalytic process, a biological process, or an enzymatic process.

9. The process of claim 8 wherein (b) comprises a decarboxylation reaction.

10. The process of claim 8 wherein the thermochemical-catalytic process uses a catalyst, the catalyst comprising palladium, platinum, nickel, silver, gold, copper, cobalt-molybdenum, nickel-molybdenum, or combinations thereof.

11. The process of claim 1 wherein (c) comprises decarboxylating the one or more medium chain fatty acids by a thermochemical-catalytic process, a biological process, or combinations thereof.

12. The process of claim 11 wherein the thermochemical-catalytic process uses a catalyst, the catalyst comprising palladium, platinum, nickel, silver, gold, copper, cobalt-molybdenum, nickel-molybdenum, or combinations thereof.

13. The process of claim 1 further comprising distilling the one or more hydrocarbons.

14. The process of claim 1 further comprising isomerizing at least a portion of the one or more hydrocarbons.

15. The process of claim 1 further comprising farming cycloalkanes from at least a portion of the one or more hydrocarbons.

16. The process of claim 1 further comprising forming alkylbenzene compounds from at least a portion of the one or more hydrocarbons.

17. The process of claim 1 wherein the jet fuel comprises JP-4, JP-5, JP-6, JP-7, JP-8, Jet A1, Jet A, Jet B, kerosene, Diesel 1, Diesel 2, Fuel Oil 1 or Fuel Oil 2.

18. The process of claim 1 wherein the jet fuel comprises at least 50% by weight the one or more hydrocarbons produced from the medium chain fatty acid source.

* * * * *